United States Patent [19]

Rajala et al.

[11] Patent Number: 4,600,549
[45] Date of Patent: Jul. 15, 1986

[54] METHOD AND DEVICE FOR PRODUCING ENDLESS SYNCHRONOUS BELT WITH MODIFED TEETH

[75] Inventors: Gregory J. Rajala, Winnebago County; Robert J. Shavlik, Brown County, Wis.

[73] Assignee: Kimberly-Clark Corporation, Neenah, Wis.

[21] Appl. No.: 603,003

[22] Filed: Apr. 23, 1984

[51] Int. Cl.⁴ .................. B29C 45/14; B29C 45/36
[52] U.S. Cl. .................... 264/154; 264/166; 264/167; 264/174; 264/257; 264/328.2; 264/328.16; 425/114; 425/115; 425/192 R; 425/543; 425/373
[58] Field of Search ............... 264/167, 166, 154, 174, 264/136, 25, 328.2, 328.16; 425/113, 115, 114, 122, 192 R, 516, 373, 362, 327, 543, 329, 325

[56] References Cited

U.S. PATENT DOCUMENTS

| | | | |
|---|---|---|---|
| 3,303,632 | 2/1967 | Halstead | 425/114 |
| 3,695,573 | 10/1972 | Huffaker et al. | 249/176 |
| 3,781,154 | 12/1973 | Herbert et al. | 425/329 |
| 3,859,025 | 1/1975 | Maroschak | 425/326.1 |
| 3,880,558 | 4/1975 | Breher et al. | 425/115 |
| 3,897,291 | 7/1975 | Hoback et al. | 264/167 |
| 3,922,125 | 11/1975 | Christensen | 425/115 |
| 3,999,914 | 12/1976 | Breher et al. | 425/115 |
| 4,058,424 | 11/1977 | Breher | 425/115 |
| 4,159,099 | 6/1979 | Maguire | 249/177 |
| 4,248,340 | 2/1981 | Hild | 198/711 |

*Primary Examiner*—Jeffery Thurlow
*Attorney, Agent, or Firm*—Kimberly-Clark Corporation

[57] ABSTRACT

Synchronous conveying belts are formed by modifying teeth grooves of a molding gear used in a molding device employing the gear. A groove plate is configured to fixedly mount in a bottom land of selected teeth of the molding gear for reducing the depth of the selected teeth of the belt to be molded. Sleeves for fixedly attaching the groove plate to the bottom land serve as molding post for forming passageways in the modified teeth extending from a backing of the belt to a top land of the modified teeth. Upon forming the reinforced elastomeric belt using the modified molding gear, transporting devices can be fastened to the backing of the belt using attachment fixtures.

14 Claims, 6 Drawing Figures

METHOD AND DEVICE FOR PRODUCING ENDLESS SYNCHRONOUS BELT WITH MODIFED TEETH

CROSS REFERENCE TO RELATED APPLICATIONS

This application is related to the following copending U.S. applications, U.S. application Ser. No. 603,002 filed Apr. 23, 1984 entitled "Conveying Systems" by Gregory Rajala et al.

BACKGROUND OF THE INVENTION

The present invention relates to the manufacture of synchronous belts for conveying articles, and more particularly to synchronous belts having selected teeth configured to receive and house attachment fixtures for mounting to the belt a variety of conveyor transporting devices in a manner as to not affect substantial changes to the belt's pitch line during conveying.

DESCRIPTION OF BACKGROUND ART

A prior method and device for producing in a continuous manner reinforced profile belts of elastomeric material with pull-resistant inserts extending in the longitudinal direction of the belt are described in U.S. Pat. Nos. 3,880,558 and 3,999,914 of Breher et al. These patents describe techniques for forming synchronous belts having a plurality of teeth of the same tooth size and profile on one side of a belt. Both Breher et al. patents teach using a steel endless band looped over a portion of a rotating wheel with peripheral teeth to form a mold component. Attached to each side of the wheel are two lateral discs which together with the endless band form a closed arc-shaped mold chamber. There is provided in a sealing manner a nozzle tube of an extruder disposed upstream of the mold chamber through which the elastomeric material and the reinforced strength members which form the belt are extruded into the mold. At an upstream end of this closed mold, the material is injected into the mold chambers; the pull-resistant inserts are inserted into the mold chamber through another series of ports ahead of the nozzle tube. Within the mold chamber the injected material solidifies. At a downstream end of the closed mold the solidified belt with precise formed teeth exists in a continuous manner.

A problem exists if there is a need to form such a continuous belt having selected teeth on one side with a variety of heights and with mounting holes disposed therein for attaching transporting devices to such a molded synchronous belt.

To mount conveying devices to synchronous belts of the aforementioned type had presented all sorts of challenges. Transporting devices such as blocks, plates, buckets, and boxes have been adhesively fastened to the backing of synchronous belts to convey light loads from one station to the next. Adhesives have been used because it has not been practical to drill holes in the timing belt, cutting the pull-resistant inserts in order to mount transporting fixtures to the belt. Transporting devices that are adhered to timing belts have been used in limited applications requiring slow belt speeds.

Detachable conveyor buckets such as the one described in U.S. Pat. No. 4,248,340 of Danny L. Hild could possibly be employed on timing belt assemblies. Such a bucket is attachable and separable from a mounting bracket without the use of attachment means such as screws, bolts and other fasteners. However, to use such a device the bracket must be affixed to the belt in a manner which would hold the bucket tightly against the belt at all times and particularly during translations of the belt about pulleys.

To enable articles to be conveyed at high synchronous belt speeds, it is desirable to provide means for integral attachment of conveying fixtures at precise locations along the belt at regions of the belt which can provide maximum structural support. It is also desirable to provide a belt having tension members inserted therein which cooperatively serve to reinforce the tensile strength of the belt yet not impede utilization of integrally connected fixtures in regions providing maximum support for the attached fixture.

Also any modification to the profile of the belt's teeth must not interfere with the conjugate action when pulley teeth engage belt teeth.

To obtain the above-mentioned desiderata, a search for various other means for attaching tansporting devices to a timing belt was initiated. This search resulted in the modification to the molding gear of the present invention.

BRIEF SUMMARY OF THE INVENTION

The present invention is concerned with methods and apparatus for modifying teeth grooves of a molding gear used for producing synchronous belts.

A groove plate is configured to fixedly mount in a bottom land of selected teeth of the molding gear for reducing the depth of the selected teeth of the belt to be molded and mounting sleeves associated with the plate are used for forming passageways in the teeth so that transporting devices may be effectively mounted to the belt.

The modified molding gear is placed in a molding chamber system and used to form a modified synchronous belt having one or more selected teeth modified so as to permit mounting the transporting devices to a top land in such a manner as to not interfere with conjugate action between toothed pulleys and the teeth of the synchronous belt.

BRIEF DESCRIPTION OF THE DRAWING

Referring to the drawing figures in which like numerals represent like parts in the several views.

DETAILED DESCRIPTION

I. Background Art Description

Figure 1:
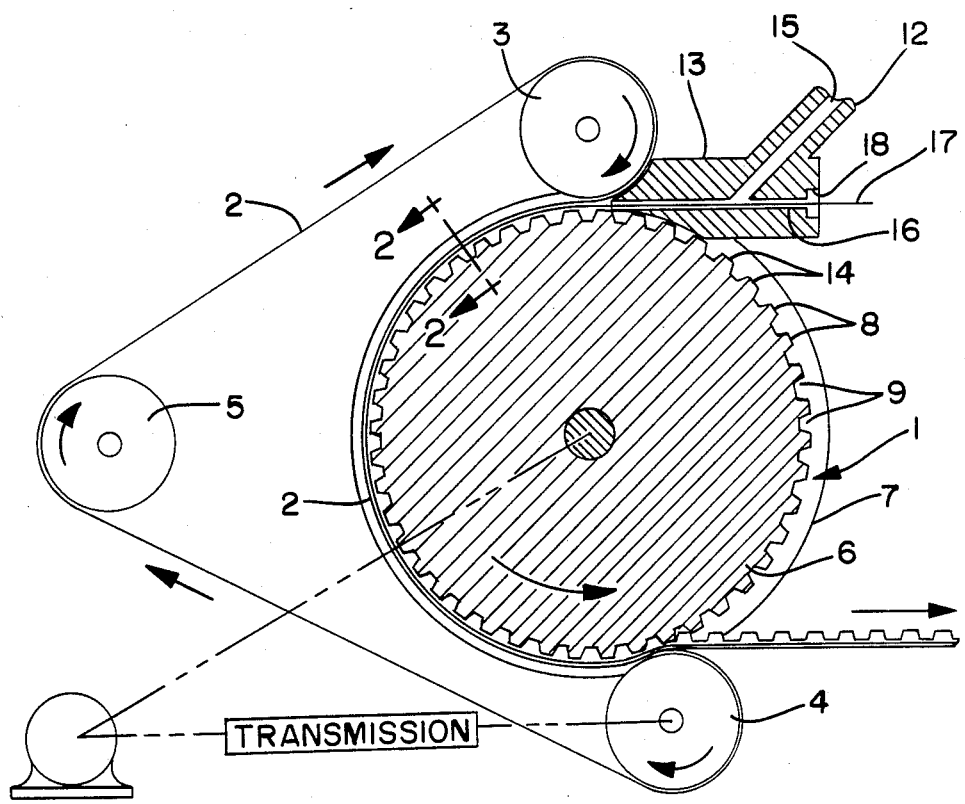
FIG. 1 is a schematic diagram of a background art belt molding device.

Referring to the drawing figures, FIG. 1 (background art) is a diagramatic illustration of a molding gear 1 as taught by Breher et al. in the aforementioned U.S. Pat. Nos. 3,880,558 and 3,999,914. In addition to the molding gear Breher's et al. device comprises a flat endless steel band 2, that travels clockwise in opposition to the rotation of gear 1, a first guide roller 3 for moving band 2 into contact with gear 1, a second guide roller 4 for moving band 2 out of contact with gear 1, and a deviating roller 5 for diverting travel of band 2 from second roller 4 back to the first roller 3. Rollers 3 and 4 are disposed to cause band 2 to travel in a half-circle arc about a portion of the periphery of gear 1.

Figure 2:
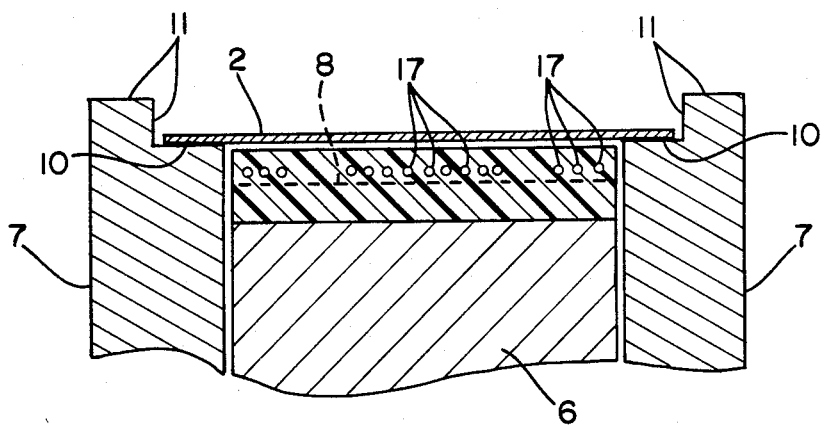
FIG. 2 is a cross sectional view of a portion of FIG. 1 taking along the lines II—II.

Molding gear 1 comprises a central profile drum 6 having a plurality of teeth 8 with grooves 9 on its periphery and a pair of lateral circular discs 7 sandwiching drum 6 therebetween. The teeth 8 with grooves 9 form a precise pattern for forming the belt's teeth. As band 2 makes its half-circle arc over gear 1, the teeth and grooves of the drum within that arc are closed off creating a hollow mold wherein the elastomeric material can be extruded. To assure that the steel band 2 maintains a desired distance from the crest of the teeth 8 in conformance with a desired thickness of the belt to be formed, as shown in FIG. 2, each disc 7 has a shoulder region 10 on which the band 2 rests. The lateral outer edges of the shoulder region of disc 7 have guide edges 11 which precisely guide the steel band 2 over the half-circle arc in a direction transverse to the direction of movement of the band. By exchanging the drum 6, the device according to Breher et al. "may in a simple manner be used for the production of profile belts having different thickness and different types of teeth."

The closed mold section formed between the half-circle arc of band 2 and the molding gear 1 is further closed at an upstream end by a nozzle mouthpiece 13 connected to a nozzle tube 12. The upper portion of the nozzle mouthpiece 13 engages a portion of band 2 looped around roller 3. The lower portion of the nozzle mouthpiece engage the crest surfaces 14 of the teeth 8 of drum 6 near the interface of roller 3 and the first end of the mold section. The inner surfaces of the two lateral discs slidably contact the outer edges of the nozzle mouthpiece 13. With all sides of the nozzle mouthpiece 13 enclosed by structure of the gear and band, the first end of the mold section is sealed from the outer environment.

The elastomeric material is extruded under pressure into the closed mold section through a bore 15 in mouthpiece 13. If needed to insure consistency, a heating system is disposed near bore 15 to heat the elastomeric material. An array of reinforced wires 17 is routed into the closed mold section through a plurality of laterally arranged passageways 16.

II. Present Invention Description

Figure 3:
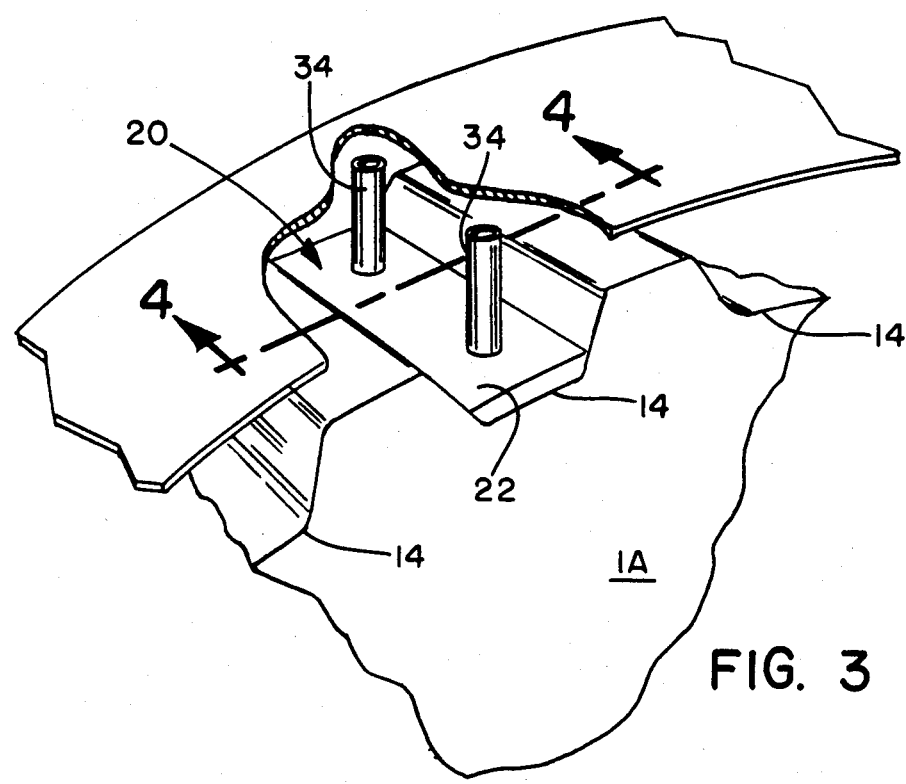
FIG. 3 is a perspective view of a groove plate of the present invention inserted in a molding gear.

To form a belt having teeth formed to accept attachment assemblies of the type disclosed in copending U.S. patent application Ser. No. 603,002 entitled "Conveying Systems" of Rajala et al., a preferred embodiment of a groove plate assembly 20 which can be inserted in any groove of a molding gear is depicted in FIG. 3. Illustratively, any groove 9 of molding gear 1 of FIG. 1 can be modified utilizing groove plate assembly 20 to form a modified gear 1A.

Figure 4:
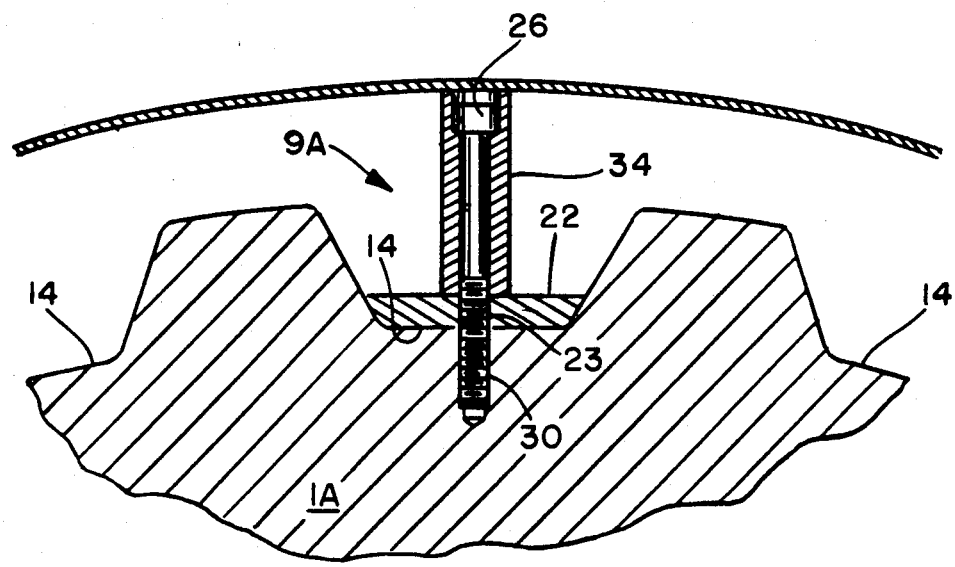
FIG. 4 is a plan view illustrative of the groove plate fastened in a groove of a molding gear by a sleeve which extends from the top surface of the plate to a flat endless band of a mold chamber.

With reference to FIGS. 3 and 4, groove plate assembly 20 is comprised of a groove plate 22, a pair of hole-forming sleeves 34 and a pair of retaining screws 26. Groove plate 22 is shaped to conform to the surface contour of the groove to be modified on a first side and to the shape of a top land of the modified teeth on the second side. Plate 22 contains a pair of holes 23 positioned at chosen locations for routing the screws 26 to mounting ports 30 best seen in FIG. 4 within the groove of the gear 1A. The height of plate 22 is determined by the height of the tip plate and the head of the attachment assembly as disclosed in copending application Ser. No. 603,002 entitled "Conveying Systems" of Rajala et al. which is used to mount transporting devices to modified teeth.

The size of sleeves 34 can be varied to form mounting holes of a variety of sizes to accommodate practically any variety of size of mounting hardware fasteners. The sleeves also serve the function of anchoring groove plate 22 securely into grooves 9A. In some applications when a single mounting hole is desired, a single sleeve and screw could be used.

After the groove plate 22 with its accompanying sleeves and screws 34 and 26 respectively are in place, modified molding gear 1A, FIG. 3, is substituted into the belt forming device of the type shown in FIG. 1. The band 2 and gear 1A are rotated in appropriate directions; the elastomeric material is extruded into the aforementioned closed mold section through bore 15; however, the array of reinforced strand members 17 is rearranged so that no wires pass in the path of sleeves 34.

To insure the reinforced strand members 17 are spaced from the top lands to the molding gear and are embedded in the pitch line region of the belt, winding noses (not shown) may be disposed on each gear tooth on which the strand members 17 rest after leaving the nozzle mouthpiece.

Figure 5:
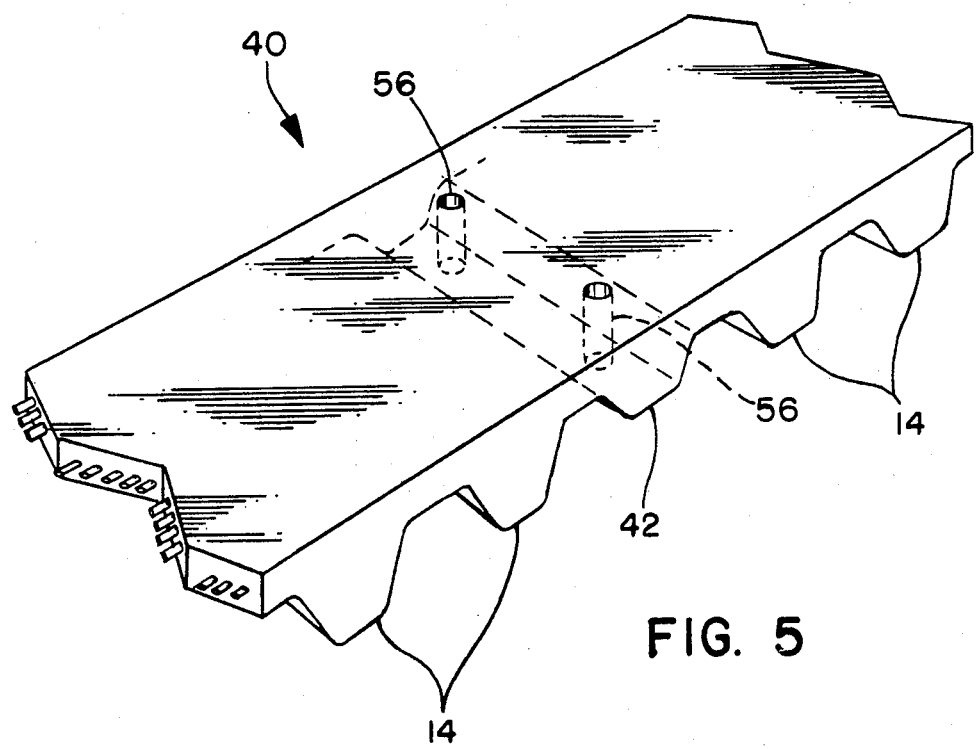
FIG. 5 is a perspective view illustrative of a reinforced synchronous belt produced by the inventive device.
Figure 6:
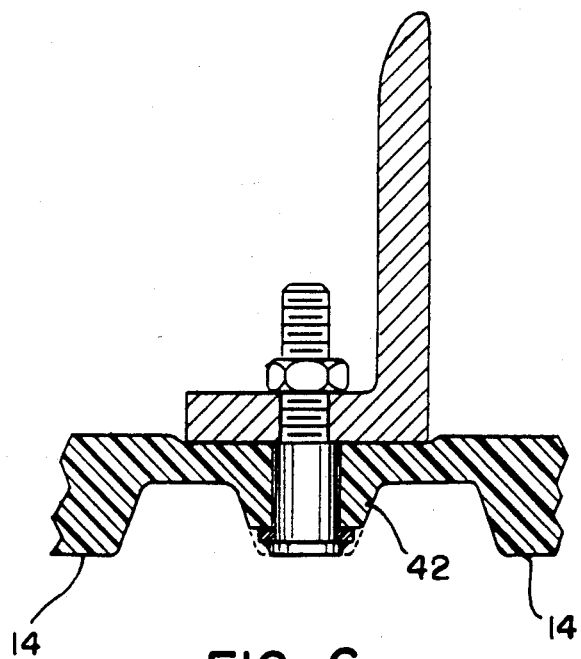
FIG. 6 is a cross-section side view illustrative of the synchronous belt formed by the inventive device being used as a conveying belt.

Referring now to FIGS. 5–6, FIG. 5 is a perspective view of a timing belt 40 with one modified tooth 42 along with a plurality of unmodified teeth 14.

FIG. 6 is a cross-section side view of a modified tooth 42 with a transporting device attached thereto using the attachment fixtures of copending application Ser. No. 603,002 of Rajala et al.

As many teeth as desired may be modified in the aforementioned manner. Various combinations of aperture 56 in the modified teeth also may be devised.

It is to be understood that the above-described embodiments are mainly illustrative of the principles of the invention. One skilled in the art may make changes and modifications to the embodiment disclosed herein and may device other embodiments without departing from the scope and the essential characteristics thereof.

What is claimed is:

1. A method for producing a toothed synchronous belt comprising the steps of:
   providing a closed molding chamber with connected alternate land portions and groove portions wherein the groove portions of the molding chamber form the teeth of the toothed synchronous belt;
   providing selected groove portions with a groove plate assembly comprising at least one structure-forming sleeve wherein at least one structure will be formed in the corresponding tooth of the synchronous belt wherein the structure will accept at least one mounting hardware fastener; and
   injecting material into the closed molding chamber.

2. The method of claim 1, further comprising providing selected groove portions with a groove plate assembly comprising at least two structure-forming sleeves wherein at least two structures will be formed in the corresponding tooth of the synchronous belt wherein the structure will accept at least two mounting hardware fasteners.

3. The method of claim 2, further comprising the step of introducing an array of reinforcing members into the closed molding chamber.

4. The method of claim 3, wherein individual members of the array bypass the sleeve positions.

5. The method of claim 4, further comprising the step of injecting material into the molding chamber.

6. The method of claim 5, further comprising the step of injecting elastomeric material into the molding chamber.

7. The method of claim 6, further comprising the step of injecting molten elastomeric material into the molding chamber.

8. An apparatus for producing a toothed synchronous belt comprising:
   a closed molding chamber with connected alternate land portions and groove portions wherein the groove portions of the molding chamber form the teeth of the toothed synchronous belt;
   multiple groove plate assemblies, one each disposed in selected said groove portions of the molding chamber, comprising at least one structure-forming sleeve wherein at least one structure will be formed in the corresponding tooth of the synchronous belt wherein the structure will accept at least one mounting hardware fastener; and
   means for injecting material into said closed molding chamber.

9. The apparatus of claim 8, wherein said groove plate assemblies comprises at least two structure-forming sleeves wherein at least two structures will be formed in the corresponding tooth of the synchronous belt wherein the structure will accept at least two mounting hardware fasteners.

10. The apparatus of claim 9, further comprising means for introducing an array of reinforcing members into said closed molding chamber.

11. The apparatus of claim 10, wherein said means for introducing an array of reinforcing members into said closed molding chamber further comprises means for causing individual members of said array of reinforcing members to bypass said structure-forming sleeves.

12. The apparatus of claim 11, further comprising injection means for injecting material into said molding chamber.

13. The apparatus of claim 12, further comprising injection means for injecting elastomeric material into said molding chamber.

14. The apparatus of claim 13, further comprising means for injecting molten material into said molding chamber.

* * * * *

UNITED STATES PATENT AND TRADEMARK OFFICE
CERTIFICATE OF CORRECTION

PATENT NO. : 4,600,549
DATED : July 15, 1986
INVENTOR(S) : G. J. Rajala, et al.

It is certified that error appears in the above-identified patent and that said Letters Patent are hereby corrected as shown below:

In the title, delete "MODIFED" and substitute therefor --MODIFIED--.

Column 1, line 32, delete "peipheral" and substitute therefor --peripheral--.

Column 2, line 20, delete "tansporting" and substitute therefor --transporting--.

Column 6, line 6, delete "comprises" and substitute therefor --comprise--.

Signed and Sealed this

Twenty-first Day of October, 1986

[SEAL]

Attest:

DONALD J. QUIGG

Attesting Officer     Commissioner of Patents and Trademarks